July 2, 1968  H. JEWELL  3,390,546
FLEXIBLE COUPLING MEMBER
Filed May 13, 1966  2 Sheets-Sheet 1
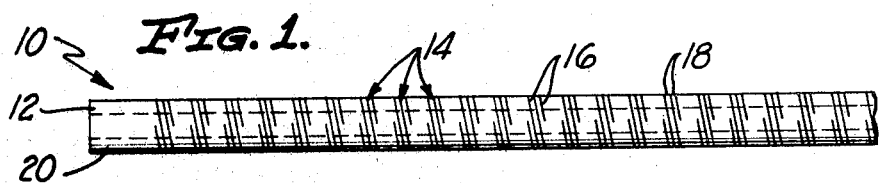
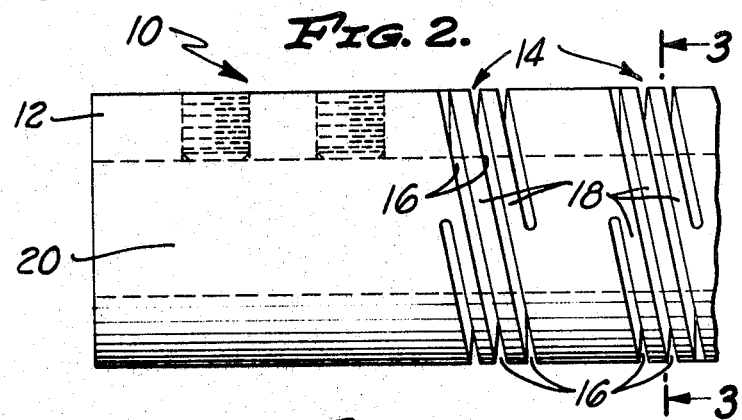
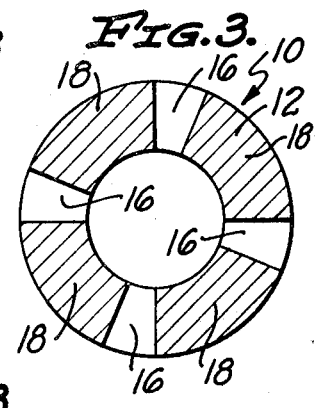
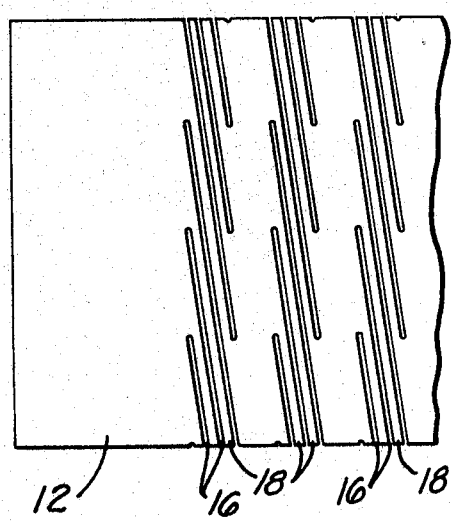
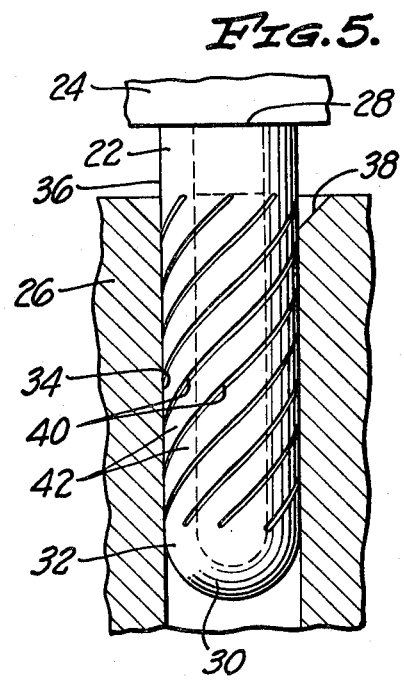
INVENTOR.
HOLLIS JEWELL
BY
MAHONEY & HORNBAKER
ATTORNEYS July 2, 1968  H. JEWELL  3,390,546
FLEXIBLE COUPLING MEMBER
Filed May 13, 1966  2 Sheets-Sheet 2
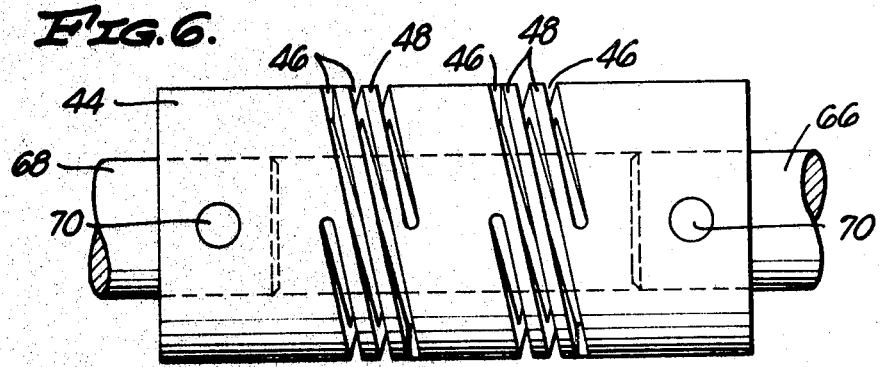
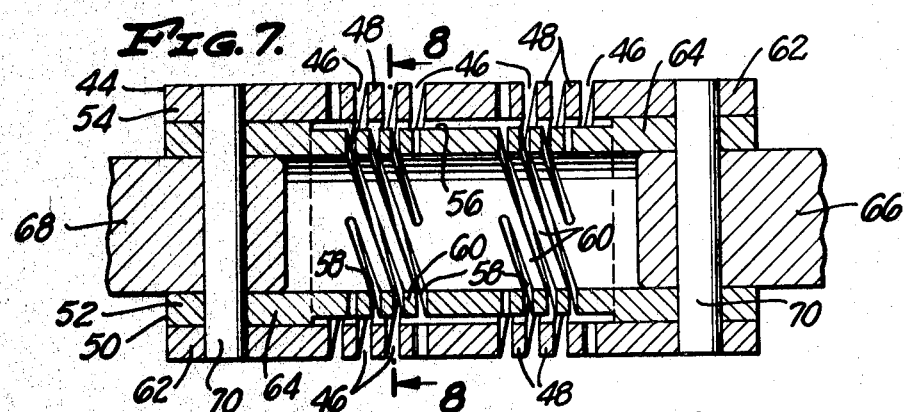
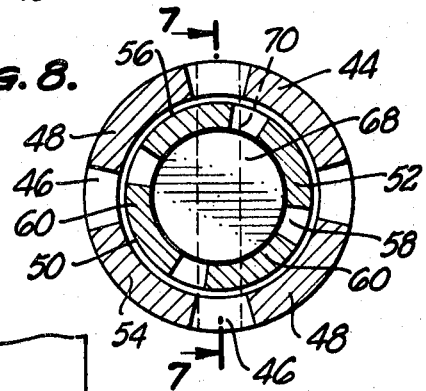
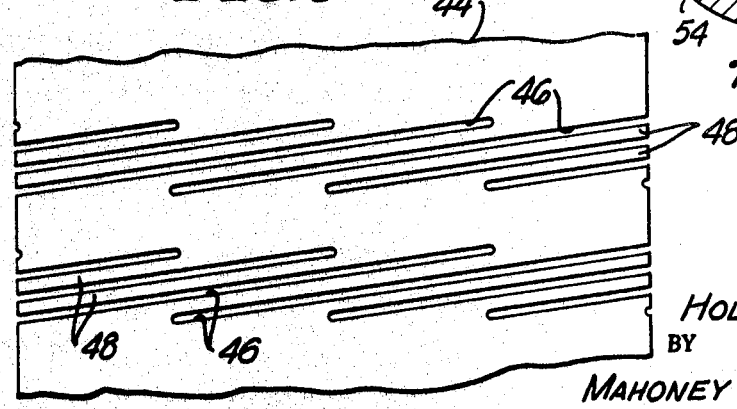
INVENTOR.
HOLLIS JEWELL
BY
MAHONEY & HORNBAKER
ATTORNEYS

United States Patent Office 3,390,546
Patented July 2, 1968

3,390,546
FLEXIBLE COUPLING MEMBER
Hollis Jewell, 1102 S. Catalina Ave.,
Redondo Beach, Calif. 90277
Filed May 13, 1966, Ser. No. 549,963
11 Claims. (Cl. 64—15)

ABSTRACT OF THE DISCLOSURE

A cylindrical metal tube is formed with at least one series of equally axially spaced, circumferentially extending, helical slots through the wall thereof, preferably starting and ending at common circumferential lines. Each slot extends less than one complete circumference of said tube wall, preferably substantially 270° of said wall. The distance between the slots perpendicular to the helical extension of said slots is less than the tube wall thickness so as to form helical beams in said tube wall having greater heights than widths and subject to tensile and compressive flexing upon ends of the tube being secured to driving and driven torsional loads.

---

This invention relates to a flexible coupling member and, more particularly, to a flexible coupling member formed as an elongated resilient member and which may be adapted for providing a flexible coupling between driving and driven shafts wherein slight misalignments may be present. Furthermore, this invention may be adapted for other similar uses where similar conditions prevail.

Many prior forms of flexible couplings have been provided, for instance, between the driving shaft of a motor and the driven shaft of a load which must be rotated by the motor. Furthermore, the prime purposes of these flexible coupling members is to provide the necessary rotatable coupling, while at the same time, permitting slight misalignments between the motor and load.

Many of these prior forms have made use of resilient material disks and the like mounted such that the rotational motion must be transmitted through the resilient material and slight deformation of the resilient material will permit the slight misalignment of the shafts. One of the principal difficulties with this form of flexible coupling is that the resilient material is necessarily resilient in all directions and when deformed in one direction and released necessarily returns to original shape and beyond so that a slight backlash is encountered which can set up undesirable vibrations as well as cause the transmission of the rotational motion to be erratic.

Some, if not all, of this backlash in this form of flexible coupling can be eliminated merely by reducing the resiliency of the resilient material. This, however, results in a consequent reduction in the flexibility of the coupling and in many cases causes the coupling to be completely unsatisfactory and fail after only minor use.

Other attempts at forming flexible couplings have been made in which merely the conventional wire springs are used for transmission of the rotational motion while permitting some flexibility between the driving and driven shafts. In this case, however, due to the fact that the springs to be effective must include multiple coils, there is a tendency for the spring to wind up with the coils moving closer together axially, thereby again resulting in a form of backlash in which erratic rotational motion is transmitted. Also, this form of spring coupling as well as the resilient material form of coupling discussed above have usually been relatively complicated and expensive and have incorporated numerous parts which have the danger of failure.

It is, therefore, an object of my invention to provide a flexible coupling member having the necessary torsional rigidity for smoothly transmitting rotational motion, yet still has the necessary flexibility for permitting misalignment between the driving and driven members. This is accomplished by forming the flexible coupling member as a metal tube having one or more series of axially spaced and generally circumferentially extending helical grooves formed therethrough wherein the natural rigidity and strength of the metal is sufficient to properly transmit the rotational load and motion, with the increase in flexibility of the metal caused by the helical grooves forming the necessary axial flexibility for the coupling member to permit the misalignments encountered.

It is a further object of my invention to provide a flexible coupling member of the foregoing type in which all danger of backlash is completely eliminated and rotational motion is smoothly transmitted therethrough. This again is the result of the fact that the helical slots are merely formed in a metal tube wherein the flexibility, although adequately provided, results merely from the extension and compression of relatively short metal beams not having the overall resilience of normal resilient material.

It is another object of my invention to provide a flexible coupling member of the foregoing type in which there can be no torsional windup of the coupling member as is commonly encouraged with the use of multicoil springs and discussed in the foregoing. This is accomplished in the present invention by the fact that the helical slots formed in the metal tubing are limited to less than one complete circumference of the tubing, preferably limited to about 270°. Thus, the curved metal beams formed by these helical slots are relatively short, approximately 180°, and there are no multicoil beams formed so that there can be no windup and there is no problem from erratic torsional loads being transmitted.

It is still an additional object of my invention to provide a flexible coupling member which may be constructed for transmitting virtually any torsional load required. This may be accomplished by properly selecting the materials for the metal tube and properly forming the helical slots, both as to the proper number of slots in a given group and the proper number of groups, which will result in the necessary torsional strength with the necessary flexibility as required. In other words, with this construction by properly choosing and properly calculating, it is possible to satisfy virtually any conditions of torsional load and flexibility. By varying the height to width to length ratio of the beams with any given material range, the torsional load, windup, and axial rigidity of the coupling member can be adjusted to any desirable combination required.

It is still another object of my invention to provide a flexible coupling member having all of the foregoing attributes yet which may be provided at a minimum of expense. This is possible by the complete simplicity of the construction and the fact that the coupling member may be formed from simple metal tubing by proper fabrication thereof in relatively simple forming operations.

Other objects and advantages of the invention will be apparent from the following specification and accompanying drawings, which are for purposes of illustration only, and in which:

FIG. 1 is a fragmentary, side elevational view of a metal tube formed according to the principles of the present invention with multiple series of axially spaced helical grooves so as to provide the flexible coupling member;

FIG. 2 is an enlarged, fragmentary, side elevational view, enlarged to more clearly show the formation of the helical grooves and also illustrating one manner in which the coupling member may be attached to the shaft of a driving or driven member;

FIG. 3 is a vertical, sectional view taken along the broken line 3—3 in FIG. 2;

FIG. 4 is an enlarged, fragmentary plan layout of a portion of the tube of FIG. 1 and clearly illustrating the circumferential degree of extension of the helical grooves;

FIG. 5 is a side elevational view, part in section, illustrating another form of the flexible coupling member incorporating the principles of the present invention wherein the metal tube having the helical grooves formed therein is fabricated as a pocket pin and will provide a flexible attachment;

FIG. 6 is a fragmentary, side elevational view of still another form of the present invention in which dual telescoped metal tubes are provided each having oppositely disposed helical grooves formed therein and attached to the shafts of driving and driven members for the transmission of rotatable motion and torsional loads therebetween;

FIG. 7 is a fragmentary, vertical, sectional view taken on the broken line 7—7 in FIG. 8;

FIG. 8 is a vertical, sectional view, part in elevation, taken on the broken line 8—8 in FIG. 7; and FIG. 9 is a fragmentary plan layout of the outer metal tube of the coupling of FIG. 6.

Referring to the drawings, one form of the flexible coupling member of the present invention is shown in FIGS. 1 through 4 and includes a cylindrical metal tube, generally indicated at 10, which is seamless and has a uniform thickness wall 12. The wall 12 is formed with one or more axially spaced series 14 of slots 16, with the slots of each series being equally axially spaced, parallel and extending generally circumferentially and helically of the tube wall. The slots 6 of each series thereby form a series of metal beams 18 extending generally circumferentially and helically in the tube wall 12.

As best illustrated in the plan layout of FIG. 4, each of the slots 16 of a single series 14 are formed with the common ends of these slots preferably on a single circumference so that all of the slots of a single series will commence on a single circumference and end on a single circumference. Also, each of the slots 16 extends less than a complete circumference of the tube 10 or less than 360°, preferably extending 270° of the circumference of the tube wall as shown.

Furthermore, and extremely important for proper and desired action of the flexible coupling member of the present invention, and as can be clearly determined by a comparison of FIGS. 2 and 3 of the drawings, the generally axial spacing between the slots 16, that is, the perpendicular distance between the slots 16 taken perpendicular to the helical extension of said slots, must be less than the radial thickness of the tube wall 12. This results in the individual metal beams 18 in the formed series of metal beams 18 each having cross-sectional dimensions of greater height than width.

This proportioning of the greater height versus smaller width of the metal beams 18 is important to gain the necessary flexibility of the flexible coupling member, while still giving a reasonable guard against torsional windup and complete elimination of flexibility for said coupling member. As stated, such proportioning is clearly shown by a comparison of FIGS. 2 and 3 of the drawings. The height of the final metal beams 18 is determined by the thickness of the tube wall 12 can be clearly seen in FIG. 3 and is far greater, nearly three times, the widths of the metal beams 18, as shown in FIG. 2, such widths being determined by the generally axial distance between the slots 16.

The importance of this proportional dimensioning of the metal beams 18 can be appreciated by considering a comparison of the metal beams 18 of the present invention with two theoretical construction providing opposite extremes of similar type coupling members. First, consider a theoretical coupling member in which the slots, and therefore the beams, extend exactly axial, or at least closely approaching axial, as opposed to the relatively extreme helical extension of the slots 16 and beams 18 of the present construction. Such theoretical straight axially bending beams will give a coupling member of quite high flexibility, but rapid windup with only slight flexing, so as to be of little value as a coupling member.

Next, consider the other extreme wherein the slots, and therefore the beams, extend exactly radial. In such case, the beams provide a coupling with extremely low flexibility, but virtually impossible to cause windup which could close the slots or the distances between the beams. This latter theoretical coupling member will not give the desired flexibility, even though it has a complete safeguard against the windup and closing of the slots or distances between the beams.

In the construction of the present invention, the angle of helical extension of the slots 16, and therefore the metal beams 18, is intermediate the two extremes discussed above, that is, the flexibility is reduced somewhat from the theoretical maximum flexibility, yet the danger of windup during such flexing has been reduced to a practical amount. In order to reduce the danger of windup to the practical amount, it is necessary to move closer to the extreme of completely eliminating windup, and in view of this, the cross-sectional proportion of the metal beams 18 is extremely important in order to retain necessary flexibility. By providing the metal beams 18 with greater height than width in cross section, it has been found that sufficient flexibility has been retained, yet the danger of windup from the practical standpoint has been eliminated.

Thus, opposite ends 20 of the tube 10 axially outward of the series 14 of slot 16 may be secured to driving and driven members, not shown, for the transmission of a torsional load through the tube 10. Slight axial misalignments between the driving and driven members or slight pulsations in the torsional load greater than the rigidity of the tube 10 will cause alternate tensile and compressive flexures of the beams 18 formed axially between and by the slots 16 of each of the series 14. In this manner, a flexible coupling is provided by the thusly formed tube 10 which may be precalculated to provide the desired and necessary torsional rigidity for transmitting the torsional load, yet will have the necessary flexibility for allowing slight axial misalignments between a driving and driven member, as well as slight pulsations in the torsional load which may exceed the rigidity of the flexible coupling member.

A further illustration of the flexible coupling member principles of the present invention is illustrated in FIG. 5 as incorporated in a pocket pin 22 between a first member 24 and a second member 26 wherein torsional loads are encountered between these members.

As shown, the pocket pin 22 is of metal and is tubular having an open end 28 and a closed end 30 with a uniform thickness axially extending wall 32. Furthermore, the open end 28 of pin 22 is secured to the first member 24 and the major portion of the pin spaced slightly from the first member is received in a cylindrically extending opening 34 formed in the second member 26. The outer surface 36 of that portion of pin 22 received in opening 34 is radially compressively engaged by the second member 26 and the second member may be chamfered slightly at the commencement of the opening 34 as at 38 for greater ease in reception of the arcuate closed end 30 in the opening 34.

As still further shown in FIG. 5, the major part of that portion of the pin wall 32 within the opening 34 is formed with a series of axially spaced, parallel, generally circumferentially and helically extending slots 40 therethrough preferably commencing on a single circumference and terminating on a single circumference. Thus, the slots 40 again form a series of axially spaced, parallel, helically extending metal beams 42 which serve to torsionally interconnect the first and second members 24 and 26 while permitting slight torsional flexure between these members by virtue of slight tension and compressive flexure of the beams 42. Furthermore, in order to provide the necessary torsional rigidity for the beams 42 formed by the slots 40, these slots extend less than a full circumference of the pin 22, that is, less than 360° and are preferably formed extending 270°.

Still a further form of flexible coupling member incorporating the principles of the present invention is shown in FIGS. 6 through 9. In this case, an outer cylindrical metal tube 44 is formed with two series of the axially spaced, parallel, generally circumferential and helically extending slots 46 so as to form the axially spaced, parallel helical beams 48 all in the same manners and positions as the flexible coupling member previously described and shown in FIGS. 1 through 4.

In this third form, however, a second or inner tube 50 is telescoped within the outer tube 44 and the portion of the wall 52 of this inner tube extending within that portion of the wall 54 of the outer tube 44 having the series of slots 46 formed therein is relieved from this outer tube wall by the formation of the undercut 56. The two series of slots 58 are formed in the inner tube wall 52 generally radially aligned with the slots 46 of the outer tube wall 54 but extending helically in the opposite axial direction so as to form the beams 60 extending helically in the opposite axial direction. Otherwise, the slots 58 are formed in the identical manner to the slots 46.

The respective ends 62 and 64 of the outer and inner tubes 44 and 50 axially outward of the series of slots 40 and 58 are secured radially together and to driving and driven members 66 and 68 by the radial pins 70.

Thus, with this third form of the flexible coupling member incorporating the principles of the present invention, torsional loads may be transmitted between the driving and driven members 66 and 68 and misalignments or torsional pulsations between these driving and driven members will be absorbed by the tensioning and the compressing of the outer tube beams 48 and inner tube beams 60. Further, it will be noted that with this double tube construction, when the outer tube beams 48 are in tension, the inner tube beams 60 will be in compression, and the opposite will be true when the torsional load is reversed.

This latter double tube form of the flexible coupling member of the present invention will be particularly useful in applications such as universal joints wherein rotatable motion is to be transmitted from the driving member 66 to the driven member 68 in both directions of rotation, while at the same time, possibly encountering some axial misalignment between the driving and driven members. Furthermore, the torsional rigidity of this dual tube construction may be greatly increased over that normally possible with similar materials in a single tube construction due to the simultaneous compression of the helical beams of one tube during the tensioning of the helical beams of the other tube. The undercut 56 of the inner tube 50 in the location of the inner tube slots 58 and thus the inner tube beams 60, eliminates any possible friction and heat build up between the outer and inner tubes 44 and 50 and permits free tensile and compressive movement of the outer and inner tube beams 42 and 60 without interference therebetween.

It is evident, of course, that in all forms of the flexible coupling member of the present invention including those illustrated, the particular flexible coupling member may be precalculated and adapted to the particular application and torsional loads to be encountered. For instance the tensile and compressive strengths of the various helical beams formed by the helical slots may be varied by a proper selection of the type of metal from which the particular tube is formed. Furthermore, the axial spacing of the slots, the number of slots in any particular series and the number of axially spaced series may be changed between various applications in order to provide the necessary torsional rigidity while at the same time, the necessary torsional flexibility as required. All of these changes, modifications and precalculations are fully contemplated within the principles of the present invention.

I thereby provide with my invention various forms of flexible coupling member, all of which have the necessary torsional rigidity for smoothly transmitting rotational motion, yet still having the necessary flexibility for permitting misalignments as well as slight load pulsations between the driving and driven members to which the coupling member is attached. Also, all danger of backlash through the flexible coupling mmebers, or as a result thereof, is completely eliminated and the rotational motion is smoothly transmitted therethrough in view of the fact that the slots formed in the tubes are always less than one complete circumference of less than 360°. Further, with the various possible constructions of the present invention, not only is an extremely simple and economical flexible coupling member provided, but one which has complete versatility for the reason that it is possible by properly choosing and properly precalculating the particular construction required to satisfy virtually any conditions of torsional load and flexibility and for virtually any application in which a flexible coupling member may be advantageously used.

I claim:

1. In a flexible coupling member, the combination of: a cylindrical metal tube having a wall, said wall having a radial wall thickness; and at least one series of equally axially spaced, generally circumferentially extending, helical slots formed through said tube wall, each slot extending less than one complete circumference of said tube wall, said slots being spaced apart generally axially in helical extension thereof a lesser distance than said radial thickness of said tube wall, and said slots forming axially spaced, generally circumferentially extendings, helical beams in said tube wall having greater cross-sectional heights than widths so as to be subject to tensile and compressive flexing upon ends of said tube being secured to driving and driven torsional loads.

2. A flexible coupling member as defined in claim 1 in which each of said lots of said one series extends circumferentially substantially 270° of said tube wall.

3. A flexible coupling member as defined in claim 1 in which at least a second series of slots is formed through said tube wall substantially identical to said first series and axially spaced therefrom.

4. A flexible coupling member as defined in claim 1 in which a plurality of series of slots are formed through said tube wall in addition to and substantially identical to said first series, and all of said series of slots are equally axially spaced one from the next adjacent.

5. A flexible coupling member as defined in claim 1 in which each of said helical slots commence on a common circumferential line and terminate on a common circumferential line.

6. A flexible coupling member as defined in claim 1 in which each of said slots of said one series extends circumferentially substantially 270° of said tube wall, and each of said slots commences on a common circumferential line and terminates on a common circumferential line.

7. A flexible coupling member as defined in claim 1 in which at least a second series of slots is formed through said tube wall substantially identical to said first series and axially spaced therefrom; and in which each of said first and second series of slots extend helically in the same axial direction.

8. In a flexible coupling member, the combination of: an elongated, hollow member having a cylindrical wall, said wall having a radial wall thickness; and at least one series of spaced, circumferentially extending, helical slots formed through said member wall, said slots being spaced apart generally axially in helical extension thereof a lesser distance than said radial thickness of said tube wall, and said slots being positioned with portions of said member wall between said slots forming a series of separated, circumferentially extending, helical beams having greater cross-sectional heights than widths so as to be subject to tensile and compressive flexing upon ends of said member wall outward of said slots and beams secured to driving and driven torsional loads.

9. In a flexible coupling member, the combination of: a cylindrical metal tube having a wall; at least one series of equally axially spaced, generally circumferentially extending, helical slots formed through said tube wall, each slot extending less than one complete circumference of said tube wall, said lots forming axially spaced, generally circumferentially extending, helical beams in said tube wall subject to tensile and compressive flexing upon ends of said tube being secured to driving and driven torsional loads; one of said tube ends being secured to a first member, said tube being outwardly compressively engaged radially outwardly of at least a part of said slots and beams by a second member, said first member being free of engagement with said second member except through said tube.

10. In a flexible coupling member, the combination of: a first cylindrical metal tube having a wall; at least one series of equally axially spaced, generally circumferentially extending, helical slots formed through said first tube wall, each slot extending less than one complete circumference of said first tube wall, said slots forming axially spaced, generally circumferentially extending helical beams in said first tube wall subject to tensile and compressive flexing upon ends of said first tube being secured to driving and driven torsional loads; a second cylindrical metal tube telescoped with said first cylindrical tube; said second tube having a wall and at least one series of equally axially spaced, generally circumferentially extending, helical slots formed through said wall substantially radially underlying said slots of said first tube wall, said second tube slots extending helically in an opposite axial direction from said first tube slots; a facing surface of one of said first and second tube walls being radially relieved from a facing surface of the other of said tube walls throughout at least the axial extent of said first and second tube slots; ends of said first and second tubes being secured together axially spaced from said first and second tube series of slots.

11. A flexible coupling member as defined in claim 10 in which a second series of slots is formed through each of said first and second tube walls substantially identical to said first series in each of said walls and axially spaced therefrom, said second series of slots in each of said first and second tube walls having the same positioning and extension relationship to each other as said first series of slots in said first and second tube walls.

References Cited

UNITED STATES PATENTS

| | | | |
|---|---|---|---|
| 350,631 | 10/1886 | Leaman | 64—15 |
| 553,811 | 1/1896 | De Laval | 64—1 |
| 1,557,958 | 10/1925 | Anderson | 64—15 |
| 1,987,316 | 1/1935 | Zimmer | 64—15 |
| 2,343,079 | 2/1944 | Pickwell | 64—15 |
| 2,453,383 | 11/1948 | Rathman | 64—15 |
| 3,009,360 | 11/1961 | Morsewich | 267—1 |

FOREIGN PATENTS 101,866  3/1899  Germany.

HALL C. COE, *Primary Examiner.*